(12) United States Patent
Zima

(10) Patent No.: US 10,660,187 B1
(45) Date of Patent: May 19, 2020

(54) SMARTPHONE CONTROLLED ACCENT LIGHTING SYSTEM AND ASSOCIATED METHOD OF OPERATION

(71) Applicant: Brian Zima, Miami Beach, FL (US)

(72) Inventor: Brian Zima, Miami Beach, FL (US)

( * ) Notice: Subject to any disclaimer, the term of this patent is extended or adjusted under 35 U.S.C. 154(b) by 0 days.

(21) Appl. No.: 16/576,740

(22) Filed: Sep. 19, 2019

(51) Int. Cl.
| H05B 37/02 | (2006.01) |
| H05B 47/19 | (2020.01) |
| H04M 1/725 | (2006.01) |
| H05B 45/10 | (2020.01) |
| H05B 45/20 | (2020.01) |
| F21Y 115/10 | (2016.01) |
| F21V 3/02 | (2006.01) |

(52) U.S. Cl.
CPC ........ H05B 47/19 (2020.01); H04M 1/72533 (2013.01); H05B 45/10 (2020.01); H05B 45/20 (2020.01); F21V 3/023 (2013.01); F21Y 2115/10 (2016.08)

(58) Field of Classification Search
CPC ................................ H05B 45/10; H05B 45/20
See application file for complete search history.

(56) References Cited

U.S. PATENT DOCUMENTS

| 6,249,091 B1 | 6/2001 | Belliveau |
| 8,531,134 B2 | 9/2013 | Chemel et al. |
| 2015/0022100 A1 | 1/2015 | Zhang et al. |
| 2016/0284176 A1 | 9/2016 | Harrington et al. |
| 2017/0018215 A1* | 1/2017 | Black .................. G02F 1/29 |
| 2017/0061904 A1* | 3/2017 | Lin .................... H05B 45/10 |
| 2018/0005590 A1* | 1/2018 | Komanduri ............ F21V 3/02 |
| 2018/0146533 A1* | 5/2018 | Goodman .......... H05B 45/20 |

FOREIGN PATENT DOCUMENTS

CN 204014205 12/2014

* cited by examiner

*Primary Examiner* — Thuy V Tran
(74) *Attorney, Agent, or Firm* — LaMorte & Associates, P.C.

(57) ABSTRACT

A lighting system and its method of operation that enables multiple independent light assemblies to be simultaneously controlled. The light assemblies contain a matrix of LEDs that are capable of generating different color profiles throughout a range of intensities. The light assemblies also contain a control module that controls the color profiles and the range of intensities being produced by the LEDs. A custom software application is run on a smartphone. The software application enables manual selection of the color profiles and the range of intensities, and the smartphone generates command signals that are transmitted to the light assemblies for execution. The software application generates a control screen on the smartphone that plots the color profiles against the range of intensities. The color profiles and the range of intensities are selected by touching a point on the control screen.

14 Claims, 5 Drawing Sheets

SMARTPHONE CONTROLLED ACCENT LIGHTING SYSTEM AND ASSOCIATED METHOD OF OPERATION

BACKGROUND OF THE INVENTION

1. Field of the Invention

In general, the present invention relates to light assemblies that contain an array of LEDs and a controller for lighting the LEDs. More particularly, the present invention relates to remote control systems for controlling the operation of the light assemblies either individually or as part of a synchronized set.

2. Prior Art Description

There are many light assemblies that contain an array of LEDs. Such light assemblies can be adjusted and controlled in various manners. For example, many light assemblies contain manual controls that enable the light assemblies to be selectively brightened or dimmed. This is typically achieved by using LEDs that are wired to a common power source and varying the output of that power source. There are also many applications where the hue of a light assembly can be controlled by lighting different colored LEDs within a matrix. This is typically achieved by using LEDs that are wired to a common drive circuit controller. As such, if multiple lights are to be controlled together, they must be linked by wire or linked to a common power source in order to be simultaneously controlled.

In the prior art, specialized controls have been developed to control linked light assemblies. For example, in night clubs, multiple linked lights are often wired to a control panel that enables a DJ or a lighting engineer to control the lights and cause the lights to pulse in beat with music being played. Such prior art control systems are exemplified by U.S. Pat. No. 6,249,091 to Belliveau. Such systems are difficult to wire, difficult to operate, and require light assemblies that can be interlinked. As such, such systems are typically used in commercial settings and are rarely integrated into home use.

In a home, there are many types of lights. Most lights are utilitarian. However, in parts of a house, such as on a patio or along a pathway, accent lighting is often used. The accent lighting typically consists of multiple low intensity lights in a common area. The lights are often used to define a space or a pathway. The lights used in such applications are often hanging lights, such as Japanese lanterns. Such lights, being decorative in nature, are often battery operated. This enables the lights to be placed in remote locations, such as outdoor patios, where access to electrical power is limited. The lights are each independent and are not wired together. Furthermore, each of the accent lights has its own battery. Since the accent lights are individual lights that do not share a common power source, there is no commonality that can be used to control all of the accent lights in unison. Rather, the lights must be individually activated and individually controlled. In an application were multiple lights are used, the need for individual control is inconvenient, wherein it causes a person to walk between the various lights in order to create adjustments.

A need exists for a system and method of controlling multiple accent lights that do not share wiring or a common power source. In this manner, multiple lights can be controlled simultaneously and the need for a person to manually control each of the lights is eliminated. This need is met by the present invention as described and claimed below.

SUMMARY OF THE INVENTION

The present invention is a lighting system and its method of operation that enables multiple independent light assemblies to be simultaneously controlled. Each of the light assemblies contains a matrix of LEDs that are capable of generating different color profiles throughout a range of intensities. Each of the light assemblies also contains a control module that selectively controls the color profiles and the range of intensities being produced by the LEDs. The control module of each light assembly is directed by command signals that are transmitted to the control module.

A custom software application is run on a smartphone. The software application enables manual selection of the color profiles and the range of intensities, and the smartphone generates the command signals that are transmitted to the light assemblies for execution. The software application generates a control screen on the smartphone that plots the color profiles against the range of intensities. The color profiles and the range of intensities are selected by touching a point on the control screen.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention lighting control system can be embodied in many ways, only a few exemplary embodiments are illustrated. The exemplary embodiments are being shown for the purposes of explanation and description. The exemplary embodiments are selected in order to set forth some of the best modes contemplated for the invention. The illustrated embodiments, however, are merely exemplary and should not be considered limitations when interpreting the scope of the appended claims.

Figure 1:
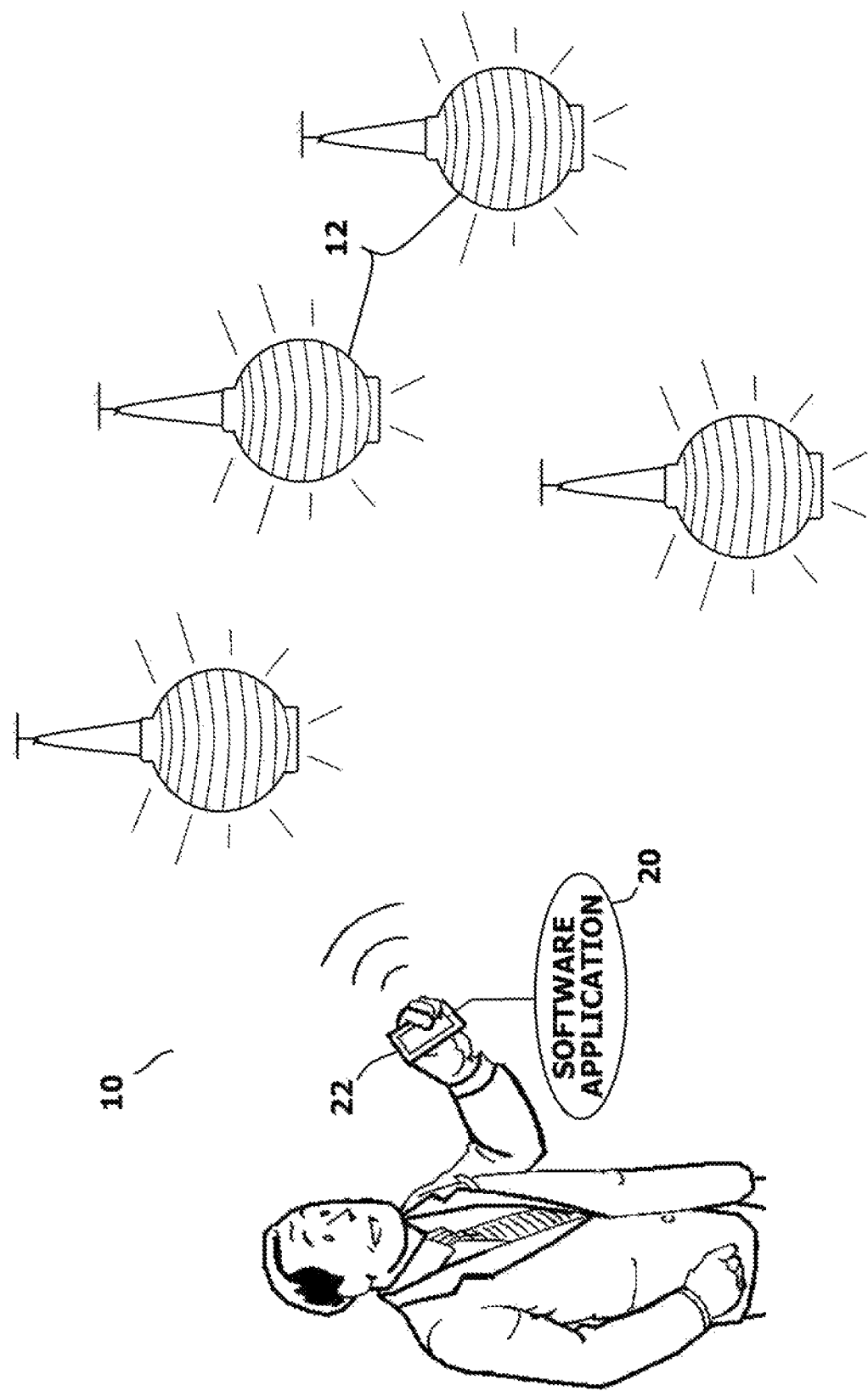
FIG. 1 shows an exemplary embodiment of the present invention system, wherein a smartphone is used to control a plurality of light assemblies.
Figure 2:
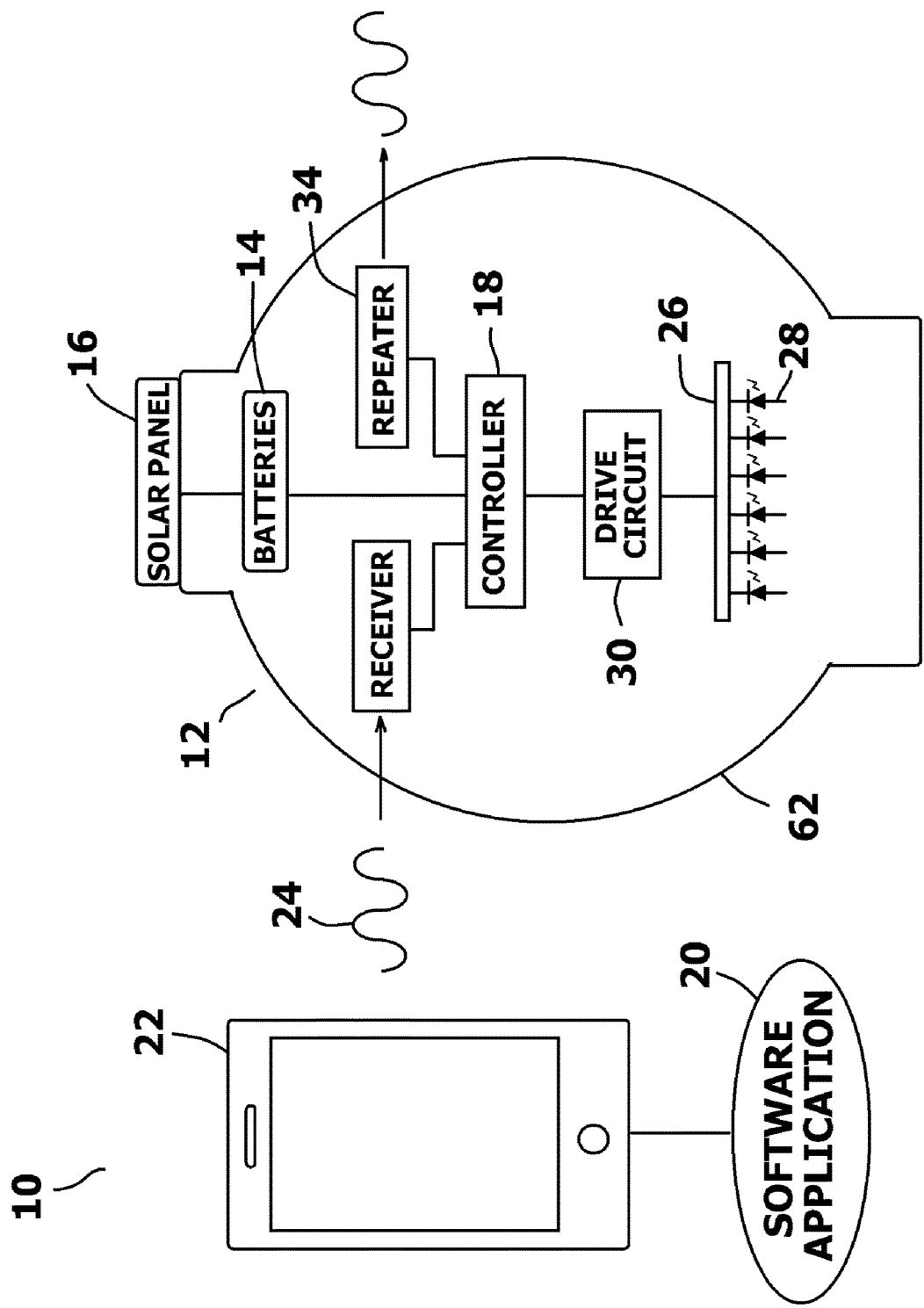
FIG. 2 shows a schematic of an exemplary light assembly for use in the present invention system.

Referring to FIG. 1, in conjunction with FIG. 2, an overview of the present invention lighting control system 10 is shown. The lighting control system 10 is used to control one or more accent lighting assemblies 12. In the shown embodiments, the accent lighting assemblies 12 are configured as Japanese lanterns. However, most any other accent light style or type can be substituted. Each accent lighting assembly 12 is self-sufficient and is powered by batteries 14. If the accent lighting assemblies 12 are intended for outdoor use, some may have solar panels 16, wherein the batteries 14 are recharged by the solar panels 16.

A control module 18 is provided as part of each of the accent lighting assemblies 12. The control module 18 enables each of the accent lighting assemblies 12 to be controlled either individually or in combination. The means to control the accent lighting assemblies 12 is provided via a software application 20 being run on a smartphone 22 or similar handheld electronic device. The control module 18 in each of the accent lighting assemblies 12 intercommunicates with command signals 24 transmitted by the smartphone 22. The control modules 18 in the various accent lighting assemblies 12 also intercommunicate so that command signals 24 can propagate between the accent lighting assemblies 12 and reach assemblies that are outside the direct range of the smartphone 22.

As will be explained, the software application 20 being run by the smartphone 22 enables the accent lighting assemblies 12 to turn on, turn off, change intensity, change color, blink, strobe, and react to auxiliary trigger signals, such as music or voice commands.

A matrix 26 of LEDs 28 is disposed within each of the accent lighting assembles 12. The matrix 26 of LEDS 28 preferably contains LEDs 28 of different colors or different hues of similar color. The matrix 26 of LEDs 28 is controlled by a driver circuit 30. The driver circuit 30 can selectively activate and/or deactivate any and all of the LEDs 28 contained within the matrix 26. The driver circuit 30 activates and deactivates the LEDs 28 as instructed by the software application 20 being run on the smartphone 22. The command signals 24 being transmitted by the smartphone 22 are transmitted as short wavelength UHF signals, such as Bluetooth® signals.

Each control module 18 contains a receiver 32 for receiving the command signals 24 from the smartphone 22. The receiver 32 forwards the command signals 24 to the driver circuit 30 for execution. A signal repeater 34 is provided that is capable of retransmitting the command signals 24 once the command signals 24 are received from the smartphone 22.

Figure 3:
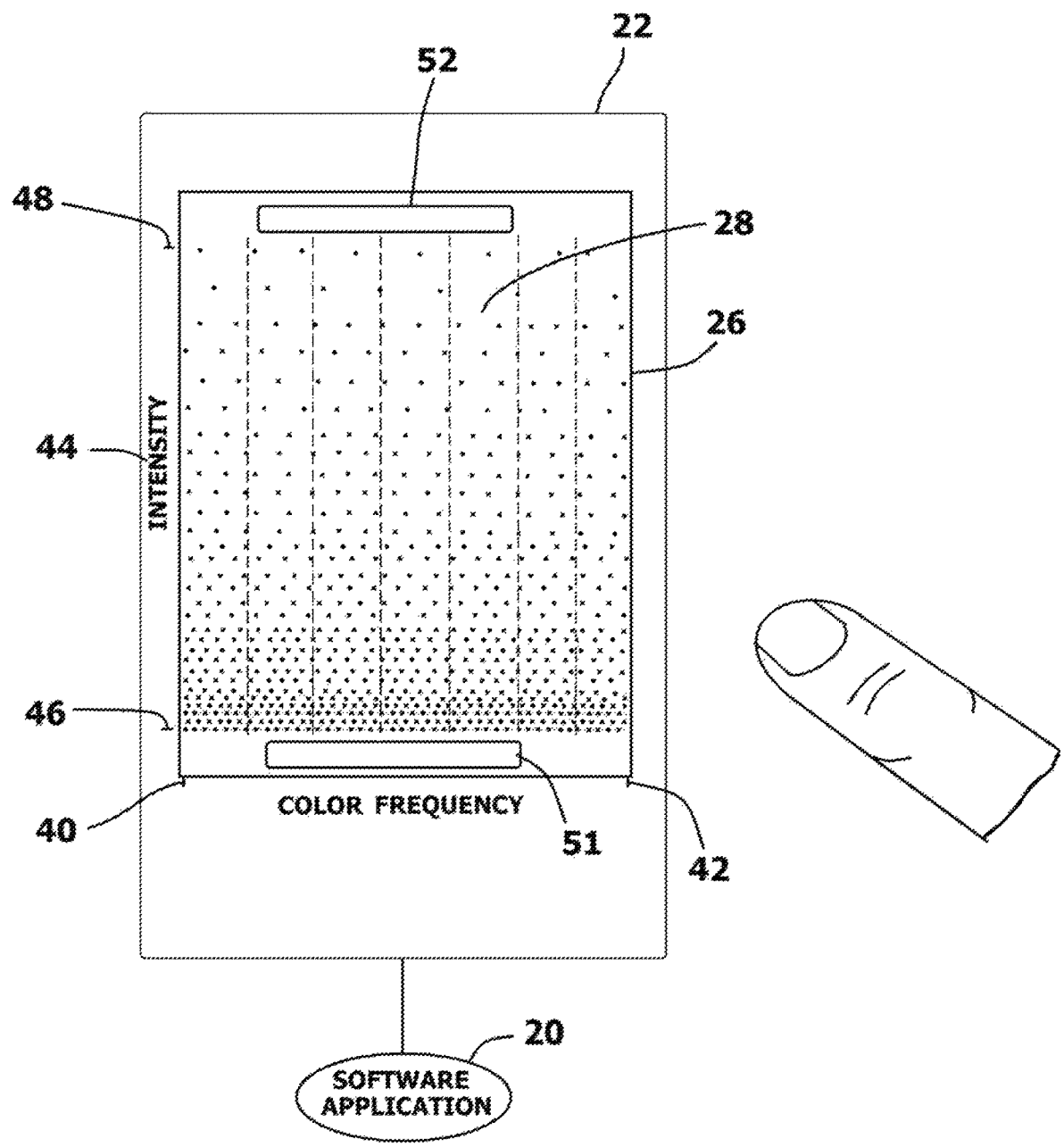
FIG. 3 shows an exemplary control screen generated by a software application of a cell phone as part of the present invention system.

Referring to FIG. 3 in conjunction with FIG. 2, a first control screen 36 is shown that is displayed by the smartphone 22 running the software application 20. This control screen 36 is produced to control the color and/or the brightness of the light emitted by the matrix 26 of LEDs 28 in the accent lighting assemblies 12. The control screen 26 shows a spectrum of colors 38 from a first color frequency 40 to a last color frequency 42. The spectrum of colors 38 can contain all the visible colors, or any segment thereof. The spectrum of colors 38 displayed on the control screen 36 corresponds to the spectrum of colors that can be obtained using the matrix 26 of LEDs 28. As such, the colors of the LEDs 28 in the matrix 26 are used to define the presented spectrum of colors 38. The spectrum of colors 38 is plotted against a range of intensities 44. The LEDs 28 in the matrix 26 have a minimum operational intensity 46 and a maximum operational intensity 48. The range of intensities 44 typically corresponds to the current and/or voltage provided to the LEDs 28 by the driver circuit 30. By plotting the spectrum of colors 38 against the range of intensities 44, the control screen 36 depicts a variety of colors and different intensity levels for each color. Sections 51, 52 of the control screen 36 are reserved for an "all on" option and an "all off" option.

To utilize the control screen 36, a user simply touches the control screen 36. The software application 20 transmits a command signal 24 that corresponds to the point of touch. That is, if a user touches the control screen 36 at point of a particular color frequency and a particular color intensity, then the corresponding command signal 24 is transmitted to the control module 18 and causes the matrix 26 of LEDs 28 to produce the selected color frequency in the selected color intensity. If the control screen 36 is touched in the "all on" section 51, then all the LEDs 28 will light. Conversely, if the control screen 36 is touched in the "all off" section 52, then all the LEDs 28 will turn off.

It will be understood that a person touching the control screen 36 may actively move their point of touch. The command signal 24 between the smartphone 22 and the control module 18 is continually updated and the matrix 26 of LEDs 28 matches the color and intensity selection of the sliding finger in near real time. The result is that the accent lighting assembly 12 changes color and will change intensity as a person moves their finger along the control screen 36.

In addition to changing the color an intensity of the of the matrix 26 of LEDs 28, the software application 20 can make the corresponding change to the color and intensity of the control screen 36 on the smartphone 22. That is, if the software application 20 makes all the light assemblies 12 a certain color hue, then the smartphone 22 can also emit that hue of light. Likewise, it the software application 20 makes the light assemblies 12 change color or flash in a certain pattern, the light of the smartphone 22 also changes as if it were one of the light assemblies 12.

Figure 4:
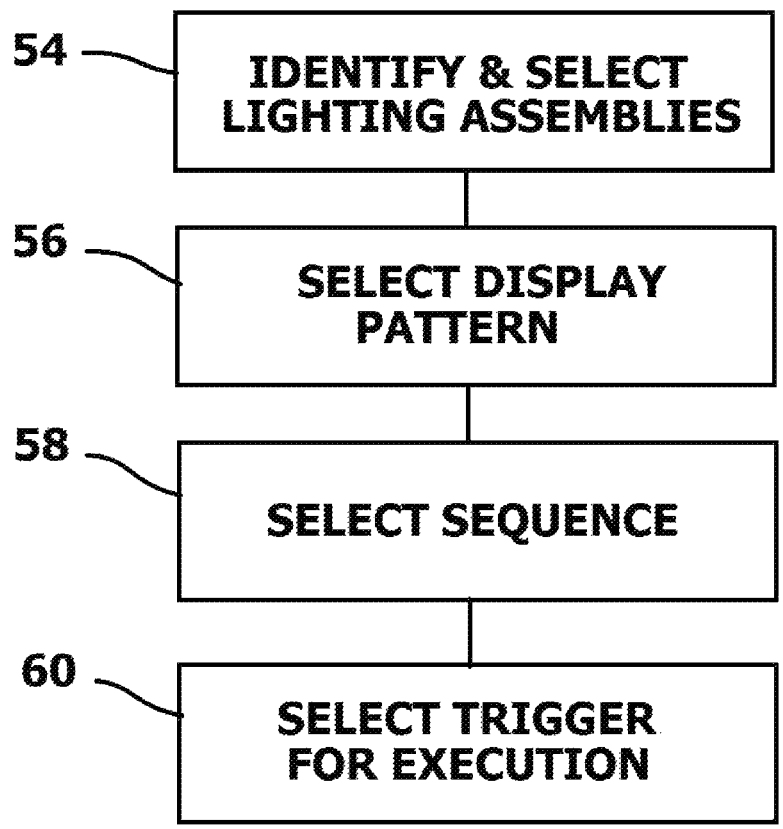
FIG. 4 is a block diagram outlining a method of operation for the present invention system.

Other than changing the color and the intensity of the matrix 26 of LEDs 28, the software application 20 can also activate and deactivate one or more accent lighting assemblies 12 in preselected patterns. Referring to FIG. 4 in conjunction with FIG. 1 and FIG. 2, it can be seen that the pattern selection has four primary steps. In the first step, the user can identify the accent lighting assemblies 12 within range of the smartphone 22 and select which of the accent lighting assemblies 12 is to be included in any patterned display. See Block 54. If more than one accent lighting assembly 12 is selected, the user can select a display pattern for each of the accent lighting assemblies 12. See Block 56. Often the light pattern desired for all of the accent light assemblies 12 is the same, to create a synchronous display among all the accent lighting assemblies 12. The selected light patterns can be slightly delayed in time between the various accent lighting assemblies 12 to create a wave effect in the changing patterns of light. If the different accent lighting assemblies are not synchronous and/or are not programmed with the same light pattern, then a lighting sequence is selected. See Block 58. In this manner, the order of activation for the accent lighting assemblies 12 can be determined.

Lastly, a trigger for starting the created light pattern is selected. See Block 60. The trigger can be a time, a command signal from the smart phone, proximity of the smartphone, or an auxiliary signal. Auxiliary signals can be spoken words or the presence of an audible musical beat. Many smartphones have programming that enable the smartphones to identify spoken words. The user can assign lighting patterns to different words or phrases. For example, a user may be able to lower the intensity of the accent lighting assemblies 12 by simply stating "dim lights" to their smartphone 22. The color hues of the accent lighting assemblies 12 can be changed by stating a color phrase such as "lights red" or "lights blue". Many smartphones also have the ability to audibly detect music and/or the ability to play music. The smartphone 22 can identify the beat of music by identifying the periodic audio signal pattern contained within the music. The pattern of activating the accent lighting assemblies 12 can be triggered by the beat of the music, therein causing the accent lighting assemblies 12 to change in synchronization to music.

As has previously been stated, each accent lighting assembly 12 may contain a signal repeater 34. In this manner, if a user enters an area that has many accent lighting assemblies 12, yet only some of the accent lighting assemblies 12 are within range of the smartphone 22, all of the accent lighting assemblies 12 can still be activated. The smartphone 22 activates the one or few accent lighting assemblies 12 in range. These accent lighting assemblies 12 propagate the command signals 24 to other accent lighting assemblies 12 that may be out of range of the smartphone 22, but are in range of other assemblies 12.

In the embodiment previously described, the matrix 26 contains LEDs 28 of different colors. The color hue of the different accent lighting assemblies 12 is altered by lighting LEDs 28 in various color combinations. However, another technique can be used to alter the color hue in a space that contains multiple accent lighting assembles 12. Each of the accent lighting assemblies 12 contains a translucent body 62 that surrounds the matrix 26 of LEDs 28. In the shown embodiment, the translucent body 62 is the spherical body of a Japanese lantern. This translucent body 62 acts as a light diffuser, wherein the translucent body 62 is internally illuminated by the light of the LEDs 28. If the LEDs 28 are colored, then the translucent housing 62 is preferably white or clear so that the translucent housing 62 will show the colors of the LEDs 28 being illuminated. However, the translucent housing 62 itself can also be colored.

Figure 5:
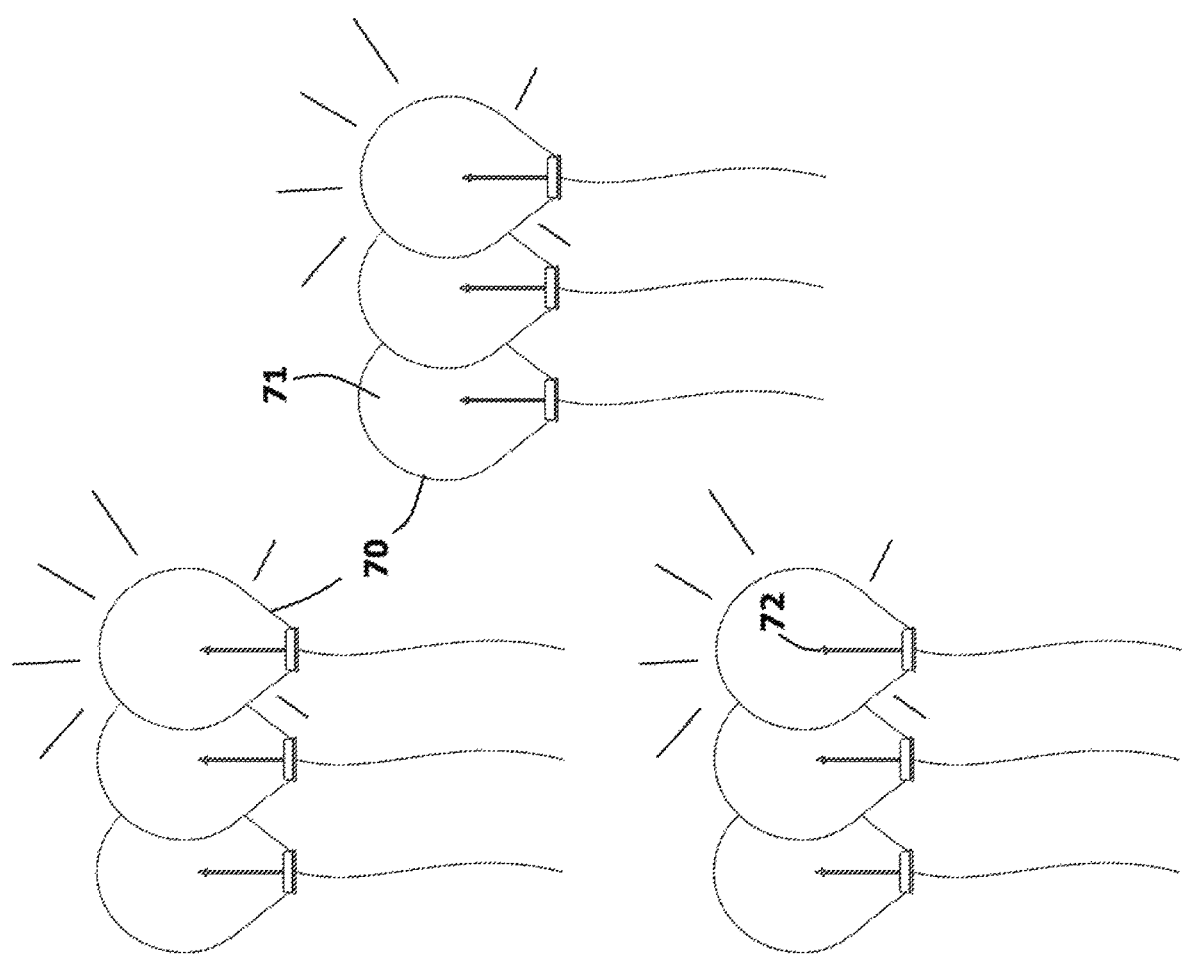
FIG. 5 shows an alternate embodiment of the present invention system.

Referring to FIG. 5, a plurality of accent lighting assemblies 70 are shown as a series of colored balloons 71. Each of the colored balloons 71 contains one or more white LEDs 72. The LEDs 72 are controlled by a driver module 74 that can activate the LEDs 72 and change the intensity of the LEDs 72. However, the color of the LEDs 72 cannot be changed. Rather, color is provided by the color of the balloon 71 surrounding the LEDs 72. If a user wants to change the hue of an area to red, the lighting assemblies 70 with red balloons can be lit, therein shining red light into the area. The colors that can be used is only limited by the colors of balloons 71 present. The ability of the lighting assemblies 70 to be controlled with patterns and various triggers remains the same.

It will be understood that the embodiments of the present invention that are illustrated and described are merely exemplary and that a person skilled in the art can make many variations to those embodiments. For instance, the shape, style and color profile of the lighting assembly can be altered. Likewise, the number and colors of the LEDs in the light assemblies can be altered. All such embodiments are intended to be included within the scope of the present invention as defined by the claims.

What is claimed is:

1. A lighting system, comprising:
a matrix that contains LEDs of different colors, wherein said matrix can generate different color profiles throughout a range of intensities;
a control module that selectively controls said color profiles and said range of intensities, wherein said control module is operated by command signals transmitted to said control module;
a smartphone that runs a software application, wherein said software application generates a control screen on said smartphone that plots said color profiles versus said range of intensities and enables manual selection of said color profiles and said range of intensities, wherein said smartphone generates said command signals that are then transmitted to said control module for execution, and wherein said color profiles and said range of intensities are selected by touching a point on said control screen.

2. The system according to claim 1, wherein said matrix of LEDs and said control module are embodied in a common light fixture.

3. The system according to claim 1, wherein said control module contains a signal repeater that retransmits said command signals received from said smartphone.

4. A lighting system, comprising:
a plurality of light assemblies that each contain at least one LED that can produce light across a range of intensities, wherein said plurality of light assemblies further includes at least one battery to power said at least one LED, and a control module that controls activation of said at least one LED, wherein said control module is operated by command signals transmitted to said control module and said control module contains a signal repeater that retransmits said command signals received from said smartphone;
a smartphone that runs a software application, wherein said software application generates said command signals that are transmitted to said control module for execution, wherein said software application enables manual selection from said range of intensities for each of said plurality of light assemblies.

5. The lighting assembly according to claim 4, wherein each of said plurality of light assemblies contains multiple LEDs in different colors that are capable of producing different color profiles.

6. The lighting assembly according to claim 5, wherein said software application enables manual adjustment of said color profiles for each of said plurality of light assemblies.

7. The lighting assembly according to claim 6, wherein said software application generates a control screen on said smartphone that plots said color profiles versus said range of intensities, wherein said color profiles and said range of intensities are selected by touching a point on said control screen.

8. The lighting assembly according to claim 5, wherein said software application causes said smartphone to emit said color profiles of said plurality of light assemblies.

9. The lighting assembly according to claim 4, wherein said software application enables a selection of an activation pattern, wherein said smartphone controls said plurality of light assemblies in said activation pattern.

10. The lighting assembly according to claim 4, wherein said plurality of light assemblies contains colored translucent bodies that are illuminated by said at least one LED, wherein said colored translucent bodies vary among said plurality of light assemblies.

11. A method of controlling the lighting of multiple lighting assemblies, comprising the steps of:
providing a plurality of separate and distinct light assemblies that each contain LEDs in multiple colors, batteries for powering said LEDs, and a control module that controls activation of said LEDs, wherein said LEDs can produce light with different color profiles across a range of intensities;
running a software application on an electronic device that is remote from said light assemblies, wherein said software application generates command signals that are transmitted to at least some of said light assemblies for execution, wherein said software application enables manual selection of said color profiles and said range of intensities for each of said plurality of light assemblies; and providing signal repeaters in said light assemblies, wherein said command signals are propagated through said light assemblies via said signal repeaters.

12. The method according to claim 11, further including generating a control screen with said software application on said electronic device that plots said color profiles versus said range of intensities, wherein said color profiles and said range of intensities are selected by touching a point on said control screen.

13. The method according to claim 12, further including selecting an activation pattern for activating said light assemblies.

14. The method according to claim 12, further including selecting a triggering signal for causing said light assemblies to automatically activate.

* * * * *